Nov. 3, 1925.  1,559,668

H. M. BROWN ET AL

METHOD OF CONNECTING CABLES AND WIRES

Filed April 7, 1923    2 Sheets-Sheet 1

Witnesses:

Inventors:
Harold M. Brown &
William G. Brown.
By Joshua R.H. Potts
Their Attorney.

Nov. 3, 1925.

H. M. BROWN ET AL 1,559,668

METHOD OF CONNECTING CABLES AND WIRES

Filed April 7, 1923  2 Sheets-Sheet 2

Witnesses:

Inventors:
Harold M. Brown &
William G. Brown.
By Joshua R H Roth
Their Attorney.

Patented Nov. 3, 1925.

1,559,668

UNITED STATES PATENT OFFICE.

HAROLD M. BROWN AND WILLIAM G. BROWN, OF CHICAGO, ILLINOIS.

METHOD OF CONNECTING CABLES AND WIRES.

Application filed April 7, 1923. Serial No. 630,450.

*To all whom it may concern:*

Be it known that we, HAROLD M. BROWN, a subject of the King of England, and WILLIAM G. BROWN, a former subject of the King of Denmark (who has forsworn his allegiance to said King of Denmark and declared his intention of becoming a citizen of the United States and therefore is not now a citizen or subject of any country), and residents of the city of Chicago, county of Cook, and State of Illinois, have invented certain new and useful Improvements in Methods of Connecting Cables and Wires, of which the following is a specification.

Our invention relates to devices for connecting cables and wires, and more particularly for connecting electric cables, wires and the like, and its main object is to provide a novel method and novel means for locking, holding, and securing electric cables, wires or any other electric connecting means, in electric connection without the use of screws, bolts or similar fastening means, or any soldering processes.

Another object is to construct said device so that the locking or securing means may readily be released for quickly disconnecting said cables or wires.

Another object is to provide a quick and simple method and means for locking or securing and for unlocking or releasing said electric connections and separating the cables.

Other objects will appear hereinafter.

The invention consists in the combination and arrangements of parts hereinafter described and claimed.

The invention will be best understood by reference to the accompanying drawings forming a part of this specification, and in which, Fig. 1 is a plan view of one form of our improved connecting device;

Figure 3:
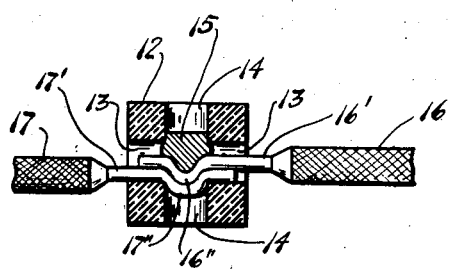
Fig. 3 shows an enlarged section on line 3—3 of Fig. 2.
Figure 5:
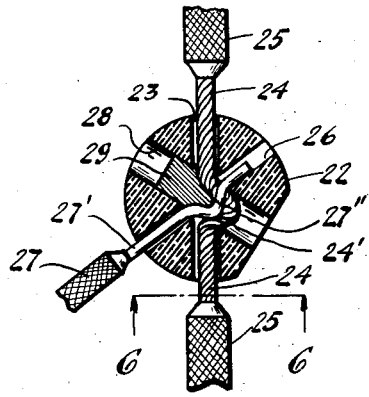
Fig. 5 is a sectional view of a modified form.
Figure 7:
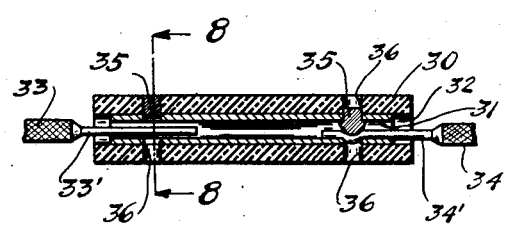
Fig. 7 is a sectional view of another modified form.
Figure 9:
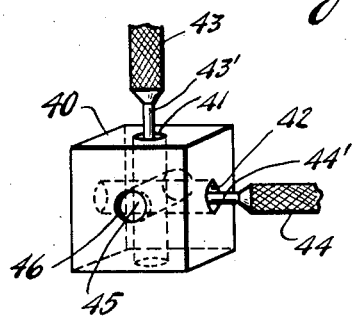
Fig. 9 is a perspective view of still another modified form of connecting device.

Our connecting device in either form comprises a member which is provided with an opening for receiving exposed portions of electric conductors and placing said conductors in electric connection. Said exposed portions may include an intermediate portion of one conductor joined by an end portion of another conductor, as shown in Fig. 5; or two exposed ends placed into the end of a metallic sleeve located in an insulated outer member and thereby joined electrically, as shown in Fig. 7; or two ends may be joined by overlapping said ends as shown in Fig. 3, or by crossing said ends in the connecting member as shown in Fig. 9; but in each form the wires are connected electrically in an opening provided in said connecting member. Said connecting members are preferably made of non-conducting or insulating composition, and the exposed portions of the conductors are directly connected therein or in a metallic sleeve mounted therein, but said members may also be made of metal to form the electric connection for conductors which are not placed in direct engagement.

Figure 1:
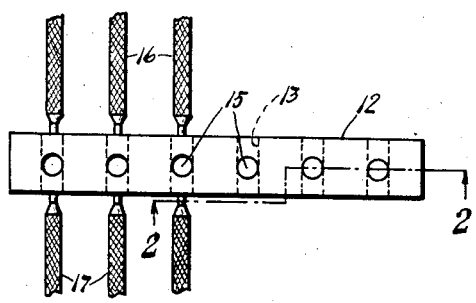
Figure 2:
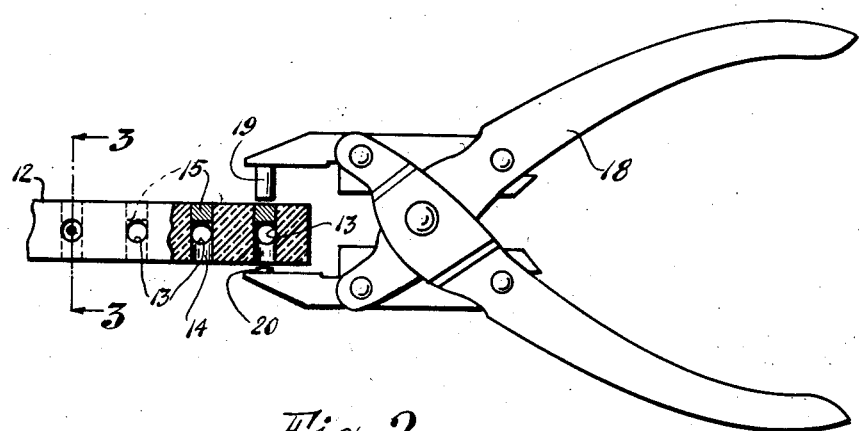
Fig. 2 is a sectional view taken on line 2—2 of Fig. 1, and also shows a suitable punch for depressing the metal plug with the connected wires.

In the form of our invention illustrated in Figs. 1 and 2 the connecting member 12 which receives the electric conductors is shown long and angular and is provided with a plurality of similar cable-receiving openings 13 which extend laterally therethrough. Each of said openings is intersected by an opening 14 which extends vertically through member 12, and a plug or member 15 of soft or pliable metal like Babbit or lead is mounted in the upper end of each opening 14, in communication with opening 13, and in position to be engaged by a suitable member or means and pressed down in opening 14 and partly spread across opening 13. The electric conductors or cables 16 and 17 have their exposed portions or ends 16' and 17' connected in the opening 13 and may be introduced from opposite ends into said opening and overlapped therein as shown in Fig. 3, or may be laid together and placed in said opening from one end as shown in Fig. 4.

Figure 4:
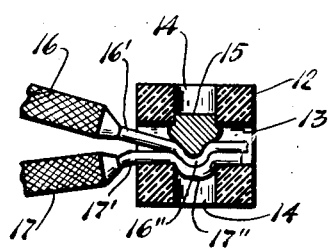
Fig. 4 shows a view like Fig. 3 but with the wires entering from the same side instead of the opposite sides of said device.

To lock the electric conductors in both electric and mechanical connection by means of our device, the exposed portions of a plurality of electric conductors are placed in opening 13 and joined across the opening 14, as best illustrated in Figs. 3 and 4. The plug or member 15 which is mounted at the upper or outer end of opening 14 is then pressed down upon the connected portions of said conductors, and since the metal of said plug 15 is slightly softer than the copper wires of the conductors it is pressed around the same, and the engaged parts 16″ and 17″ of said conductors are depressed into the lower part of said opening 14, the lower part of said plug spreading across opening 13 anchoring itself therein, while the upper part of said plug remains in opening 14, thus forming a strong and secure electric and mechanical connection.

Any suitable means may be used for depressing the plug and engaged parts of the conductors, but the particularly constructed form of device or punch 18 shown in Fig. 2 is especially suited and adapted for this purpose. It is provided with a finger or pin 19 on one jaw exactly fitting into the opening 14 for depressing the plug and engaged parts of the conductors and is of a length to depress a plug only the proper distance in the upper part of said opening 14 to leave the upper part of said plug anchored in said opening. A stub pin 20 which also fits in said opening 14 is placed on the other jaw of the punch to properly aline the finger or pin 19, and the punch is so constructed that the pins 19 and 20 on the two jaws will operate in a right line when the jaws are moved together or apart.

To release or unlock the conductors it is merely necessary to insert pin 19 of the punch in the lower part of opening 14 and press back the parts 16″ and 17″ of the conductors and therewith press the plug 15 upwards into opening 14, thereby returning the overlapping portions 16′ and 17′ substantially into their original positions, without breaking or injuring them, and permitting withdrawal of said portions from member 12.

Figure 6:
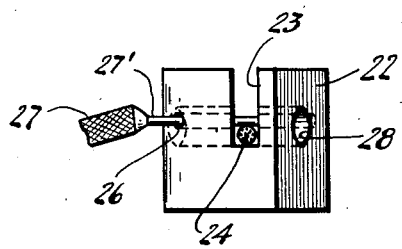
Fig. 6 is a view taken on line 6—6 of Fig. 5.

In Figs. 5 and 6 we have shown a form of device for connecting or teeing a branch or minor cable onto a main cable. In this form the connecting member 22 is substantially cylindrical and is provided with a main opening 23, preferably in the form of a slot as shown in Fig. 6, for receiving an exposed intermediate portion 24 of a cable 25, and has a smaller opening 26 which intersects said main opening at a slant and receives the exposed end 27′ of a minor cable 27. An opening 28 extends through said member and through the intersection of said openings 23 and 26, and a plug or member 29 of pliable metal is mounted in the upper end of said opening 28 in position to be pressed upon conductor portions 24 and 27′ and to depress the intersecting parts 24′ and 27″ thereof into opening 28, said conductor portions being thus securely locked together in said member. Said conductors are released or unlocked by forcing parts 24′ and 27″ and with them the plug 29 back into their former positions, preferably by means of a punch and in the manner described above in the disclosure of the preceding form.

Figure 8:
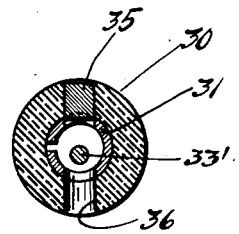
Fig. 8 is a cross sectional view taken on line 8—8 of Fig. 7.

In Figs. 7 and 8 we have illustrated a form particularly adapted for connecting the separated ends of conductors in alinement. In this form the connecting member 30 is composed of insulating material and has a metal sleeve 31 mounted in the opening 32 which extends longitudinally through said member. The cables 33 and 34 have their ends 33′ and 34′ placed in the ends of said sleeve and pliable metal plugs 35 are placed in the upper ends of openings 36 which extend through said sleeves and said member at each end and intersect the inner opening in the sleeve, said plugs being depressible upon the inserted ends of the conductors to depress portions of said ends into the lower parts of said openings 36 and lock said ends firmly in electric and mechanical connection in said device, as shown at the right-hand side of Fig. 7, and in the manner described above.

In Fig. 9, is shown a connecting member 40 which is cubical in form and has an opening extending from each side to the opposite side of the member, providing three openings which intersect at an intermediate point, two of said openings, 41 and 42, receiving the ends 43′ and 44′ of cables 43 and 44, which cross at the intersection of said openings. A plug of pliable metal 45 is placed at one end of the third opening 46 and is forced onto the intersecting parts of portions 43′ and 44′ to depress said parts into locking position in the free part of opening 46 to secure said cables in said member; and is released or unlocked as outlined above.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. The method of securing conductors of electricity in electric connection and to permit convenient release thereof, which comprises placing portions of said conductors in a retaining member having intersecting openings, and then pressing soft metal upon said portions within said openings to lock said conductors in position so that said metal and portions may be pressed back for withdrawing said conductors.

2. The method of securing electric conductors in electric connection and to permit convenient releasing and separating of said conductors, which method comprises placing exposed portions of said conductors in a retaining member having intersecting openings, then pressing pliable electricity conducting metal through one of said intersecting openings onto the adjacent conductor and therewith depressing said conductor down in said opening, in a position to be conveniently pressed back for withdrawing said conductor.

3. The method of securing electric conductors in electric connection and to permit convenient releasing and separating of said conductors, which method comprises placing exposed portions of said conductors together in a retaining member and across an opening extending through said retaining member, then pressing pliable electricity conducting metal through one part of said opening onto and around said joined conductor portions, and depressing said portions into another part of said opening, in position to conveniently press back said exposed portion and metal for withdrawing said conductors from said member.

4. The method of securing electric conductors in electric connection, which comprises placing exposed portions of said conductors together in a retaining member and across an opening extending laterally through said member, then pressing soft metal through one end of said opening around said joined portions by means of a punch having a pin fitting in said opening, and thereby depressing said connected portions with the engaging metal toward the other end of said opening.

In testimony whereof we have signed our names to this specification.

WILLIAM G. BROWN.
HAROLD M. BROWN.